United States Patent [19]

Yamaura

[11] Patent Number: 5,419,296
[45] Date of Patent: May 30, 1995

[54] FUEL VOLATILITY DETECTING APPARATUS

[75] Inventor: Kenichi Yamaura, Atsugi, Japan

[73] Assignee: Unisia Jecs Corporation, Atsugi, Japan

[21] Appl. No.: 177,099

[22] Filed: Jan. 3, 1994

[30] Foreign Application Priority Data

Jan. 5, 1993 [JP] Japan .................................. 5-000254

[51] Int. Cl.⁶ ............................................. F02D 41/06
[52] U.S. Cl. ...................................... 123/435; 73/116; 123/491
[58] Field of Search ............... 123/425, 435, 478, 491; 73/35, 116

[56] References Cited

U.S. PATENT DOCUMENTS

| | | | |
|---|---|---|---|
| 4,905,649 | 3/1990 | Washino et al. | 123/435 |
| 4,920,494 | 4/1990 | Abo et al. | 123/435 X |
| 4,984,546 | 1/1991 | Shimomura et al. | 123/435 X |

FOREIGN PATENT DOCUMENTS 63-55341  3/1988  Japan .
2-39570  3/1990  Japan .

*Primary Examiner*—Tony M. Argenbright
*Attorney, Agent, or Firm*—Foley & Lardner

[57] ABSTRACT

An apparatus for detecting a volatility of fuel supplied to an internal combustion. A target mean effective pressure is calculated based on sensed engine operating conditions. An actual mean effective pressure is calculated based on a sensed cylinder pressure. The fuel volatility is calculated as a function of the calculated target mean effective pressure and the calculated actual mean effective pressure.

8 Claims, 6 Drawing Sheets

FUEL VOLATILITY DETECTING APPARATUS

BACKGROUND OF THE INVENTION

This invention relates to an apparatus for detecting the volatility of the fuel supplied to an internal combustion engine.

It is the current practice to minimize the emission from the engine of pollutants by employing less volatile fuel such as leadless high-octane fuel. With no proper conformity between the fuel volatility and the engine control characteristic, however, the engine cannot operate at a desired air/fuel ratio, resulting in degraded driveability and increased emission of pollutants. For example, as the fuel volatility decreases, the air/fuel ratio will be leaned particularly during engine starting operation due to an increased amount of fuel collected on the inner wall surface of the intake passage, and vice-versa when the fuel volatility increases. Therefore, the fuel volatility should be measured with high accuracy to ensure that the amount of fuel supplied to the engine is correct to maintain a desired optimum air/fuel ratio. For this purpose, an electrostatic capacity type fuel volatility detecting sensor has been used. However, such a sensor is very expensive.

SUMMARY OF THE INVENTION

It is a main object of the invention to provide an inexpensive fuel volatility detecting apparatus which can ensure an accurate fuel volatility detection.

There is provided, in accordance with the invention, an apparatus for detecting a volatility of fuel supplied to an internal combustion engine having at least one cylinder. The fuel volatility factor detecting apparatus comprises means sensitive to engine operating conditions for producing signals indicative of sensed engine operating conditions, means sensitive to pressure in said cylinder for producing a signal indicative of a sensed cylinder pressure, means for calculating a target mean effective pressure based on the sensed engine opera ting conditions, means for calculating an actual mean effective pressure based on the sensed cylinder pressure, and means for calculating the fuel volatility as a function of the calculated target mean effective pressure and the calculated actual mean effective pressure.

BRIEF DESCRIPTION OF THE DRAWINGS

This invention will be described in greater detail by reference to the following description taken in connection with the accompanying drawings, in which.

DETAILED DESCRIPTION OF THE INVENTION

Figure 1:
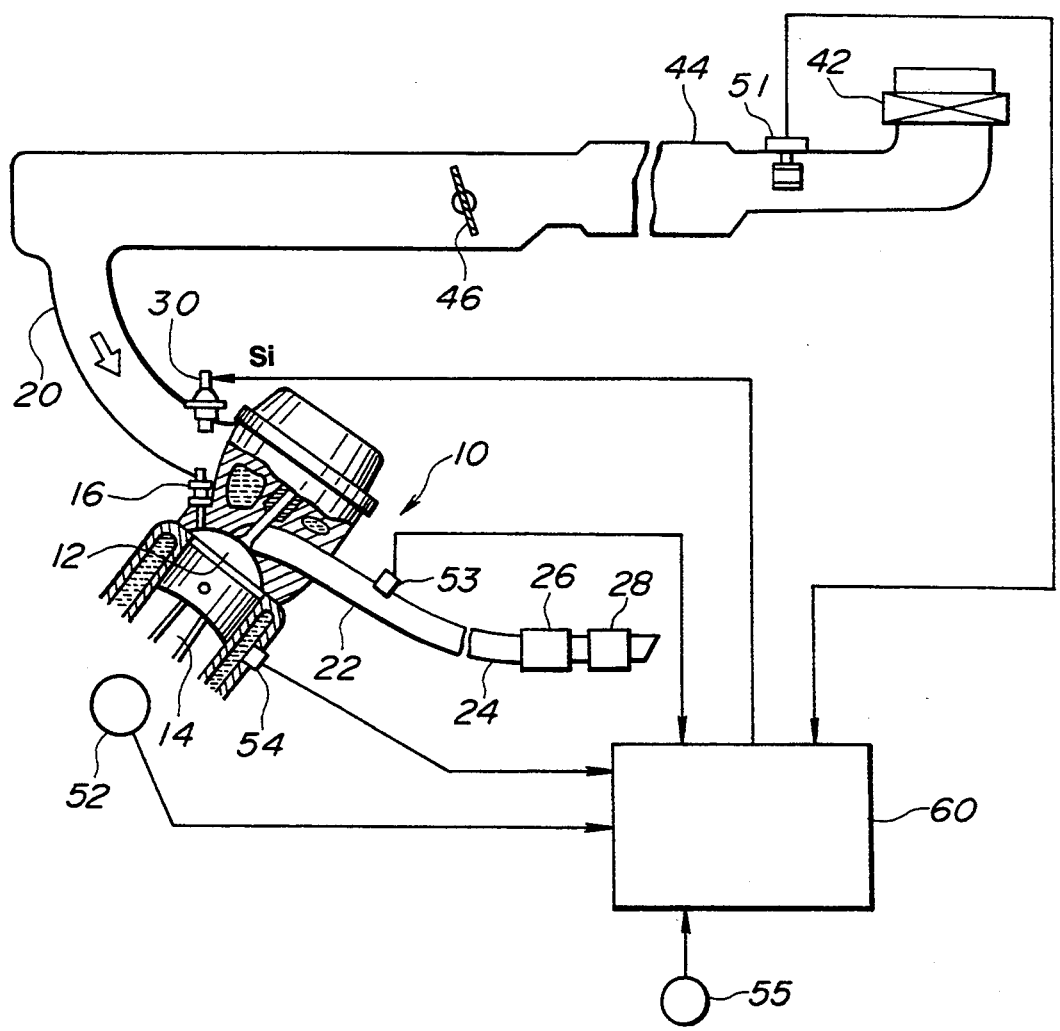
FIG. 1 is a schematic diagram showing one embodiment of a fuel volatility detecting apparatus made in accordance with the invention.

With reference to the drawings, and in particular to FIG. 1, there is shown a schematic diagram of a fuel volatility detecting apparatus embodying the invention. An internal combustion engine, generally designated by the numeral 10, for an automotive vehicle includes combustion chambers or cylinders, one of which is shown at 12. A piston 14 is mounted for reciprocal motion within the cylinder 12. A crankshaft (not shown) is supported for rotation within the engine 10 in response to reciprocation of the piston 14 within the cylinder 12.

An intake manifold 20 is connected with the cylinder 12 through an intake port with which an intake valve (not shown) is in cooperation for regulating the entry of combustion ingredients into the cylinder 12 from the intake manifold 20. A spark plug 16 is mounted in the top of the cylinder 12 for igniting the combustion ingredients within the cylinder 12 when the spark plug 16 is energized by the presence of high voltage electrical energy. An exhaust manifold 22 is connected with the cylinder 12 through an exhaust port with which an exhaust valve (not shown) is in cooperation for regulating the exit of combustion products, exhaust gases, from the cylinder 12 into the exhaust manifold 22. The exhaust manifold 22 is connected to the atmosphere through an exhaust system which includes an exhaust pipe 24, a catalytic converter 26 and a muffler 28. The intake and exhaust valves are driven through a suitable linkage with the crankshaft.

A fuel injector 30 is mounted for injecting fuel into the intake manifold 20 toward the intake valve. The fuel injector 30 opens to inject fuel into the intake manifold 20 when it is energized by the presence of electrical signal Si. The length of the electrical pulse, that is, the pulse-width, applied to the fuel injector 30 opens and, thus, determines the amount of fuel injected into the intake manifold 20.

Air to the engine 10 is supplied through an air cleaner 42 into an induction passage 44. The amount of air permitted to enter the combustion chamber 12 through the intake manifold 20 is controlled by a butterfly throttle valve 46 located within the induction passage 44. The throttle valve 46 is connected by a mechanical linkage to an accelerator pedal (not shown). The degree to which the accelerator pedal is depressed controls the degree of rotation of the throttle valve 46. The accelerator pedal is manually controlled by the operator of the engine control system. In the operation of the engine 10, the exhaust gases are discharged into the exhaust manifold 22 and hence to the atmosphere through the exhaust system.

The amount of fuel metered to the engine, this being determined by the width of electrical pulses Si applied to the fuel injector 30 is repetitively determined from calculations performed by a digital computer, these calculations being based upon various conditions of the engine 10 that are sensed during its operation. These sensed conditions include intake air flow, engine speed, exhaust oxygen content, engine coolant temperature, and cylinder pressures. Thus, an intake air flow meter 51, a crankshaft position sensor 52, an oxygen sensor 53, an engine coolant temperature sensor 54, and cylinder pressure sensors 55 are connected to a control unit 60.

The intake air flow meter 51 is located in the intake passage 44 upstream of the throttle valve 46. The air flow meter 51 is responsive to the air flow Q through the induction passage 44 and it produces an intake airflow signal proportional thereto. The crankshaft position sensor 52 is provided for producing a series of crankshaft position electrical pulses POS, each corresponding to one or two degrees of rotation of the engine crankshaft, of a repetitive rate directly proportional to engine speed N and a reference electrical pulse REF at a predetermine number of degrees before the top dead center position of each engine piston. The oxygen sensor 53 is an air/fuel ratio sensor provided to probe the exhaust gases discharged from the cylinders 12 and it is effective to produce a signal indicative of the air/fuel ratio at which the engine is operating. The engine coolant temperature sensor 54 is mounted in the engine cooling system and comprises a thermistor connected to an electrical circuit capable of producing a coolant temperature signal in the form of a DC voltage having a variable level proportional to coolant temperature TW. The cylinder pressure sensors 55 are provided to produce signals indicative of the pressures P in the respective cylinders 12. For example, the cylinder pressure sensor 55 may be of the type employing a piezoelectric force ring firmly secured to the engine by the spark plug or a cylinder head bolt tightened to rated torque to generate a charge signal corresponding to the pressure P exerted on the force ring. Preferably, the cylinder pressure sensor 55 is of the type exposed to the interior of the corresponding cylinder so as to sense the absolute pressure in the cylinder.

The control unit 60 comprises a digital computer which includes a central processing unit (CPU), a read only memory (ROM), a random access memory (RAM) and an input/output control unit (I/O). The central processing unit communicates with the rest of the computer via data bus. The input/output control unit includes an analog-to-digital converter which receives analog signals from the flow meter 51 and other sensors and converts them into digital form for application to the central processing unit which selects the input channel to be converted. The read only memory contains programs for operating the central processing unit and further contains appropriate data in look-up tables used in calculating appropriate values for fuel delivery requirement. The central processing unit calculates a fuel volatility factor as a function of actual and target mean effective pressures. It is to be understood that the term "fuel volatility factor" as used through this invention is intended to mean the degree of volatility of the fuel, that is, the degree to which the fuel is heavy (less volatile) or light (more volatile). The calculated fuel volatility factor is used to correct the amount of fuel to be supplied to the engine so as to maintain a desired air/fuel ratio regardless of fuel volatility variations.

Figure 2:
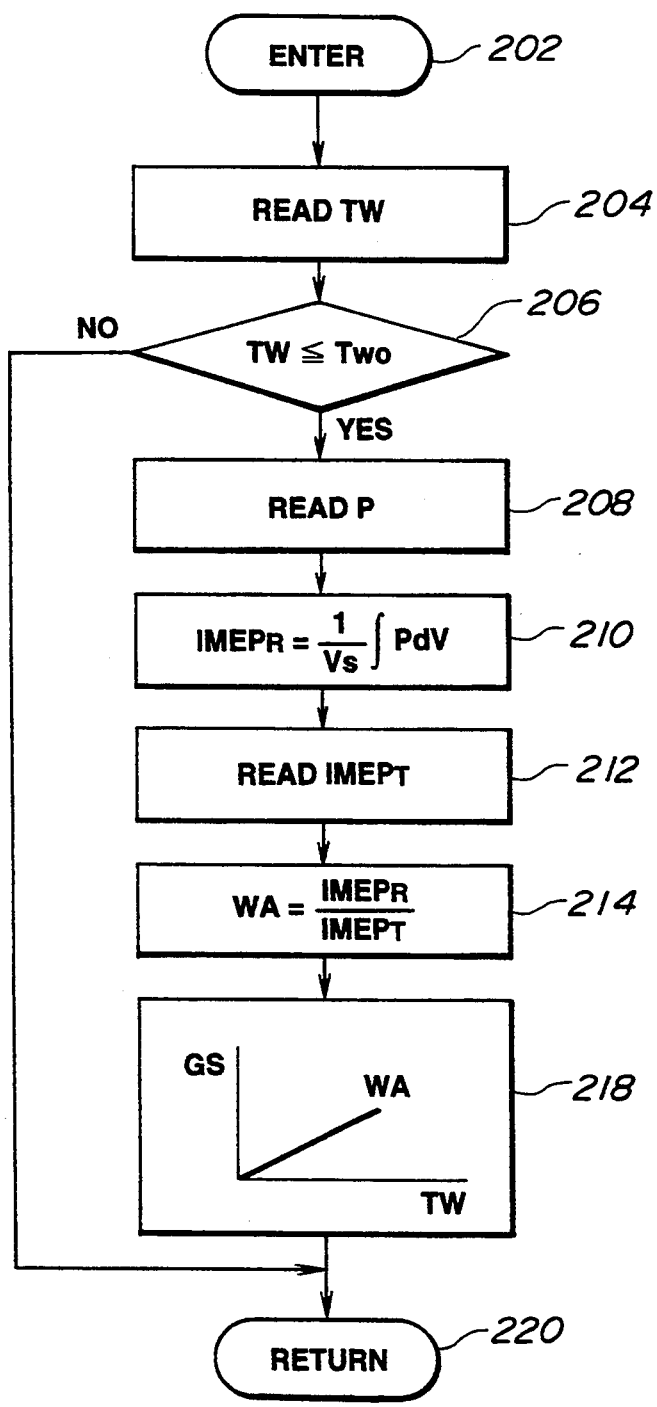
FIG. 2 is a flow diagram of the programming of the digital computer as it is used to calculate a fuel volatility factor indicative of the degree of volatility of the fuel.

FIG. 2 is a flow diagram of the programming of the digital computer as it is used to calculate a fuel volatility factor GS indicative of whether the fuel is heavy or light. The computer program is entered at the point 202. At the point 204 in the program, the engine coolant temperature TW is read in to the computer memory. At the point 206 in the program, a determination is made as to whether or not the read engine coolant temperature TW is equal to or less than a predetermined value Two. If the answer to this question is "yes", then it means that the engine is cold and the program proceeds to the point 208. Otherwise, the program proceeds to the point 220 where the computer program is returned to the point 204.

At the point 208 in the program, the cylinder pressure P is read into the computer program. At the point 210 in the program, the central processing unit calculates an actual mean effective pressure per cycle $IMEP_R$ based on the read cylinder pressure P as $IMRP_R = (1/V_S) \cdot \int P \, dv$ where $V_S$ is the stroke volume.

At the point 212 in the program, a target mean effective pressure $IMEP_T$ is read in to the computer memory. The target mean effective pressure $IMEP_T$ will be described later in connection with FIG. 3. At the point 214 in the program, the ratio WA ($= IMEP_R/IMEP_T$) of the actual mean effective pressure $IMEP_R$ with respect to the target mean effective pressure $IMEP_T$ is calculated. At the point 218 in the program, the fuel volatility factor GS is calculated based on the calculated ratio WA and the read engine coolant temperature WA from a relationship programmed in to the computer. This relationship defines the fuel volatility factor GS as a function of ratio WA and engine coolant temperature TW, as shown in the block 218 of FIG. 2. The fuel is determined as a heavy (less volatile) fuel when the calculated fuel volatility factor GS is greater than 1 and as a light (more volatile) fuel when the calculated fuel volatility factor GS is less than 1. Upon completion of this calculation, the program proceeds to the point 220 where the computer program is returned to the point 204. The calculated fuel volatility factor GS is used to control the amount of fuel to be supplied to the engine 10.

Figure 3:
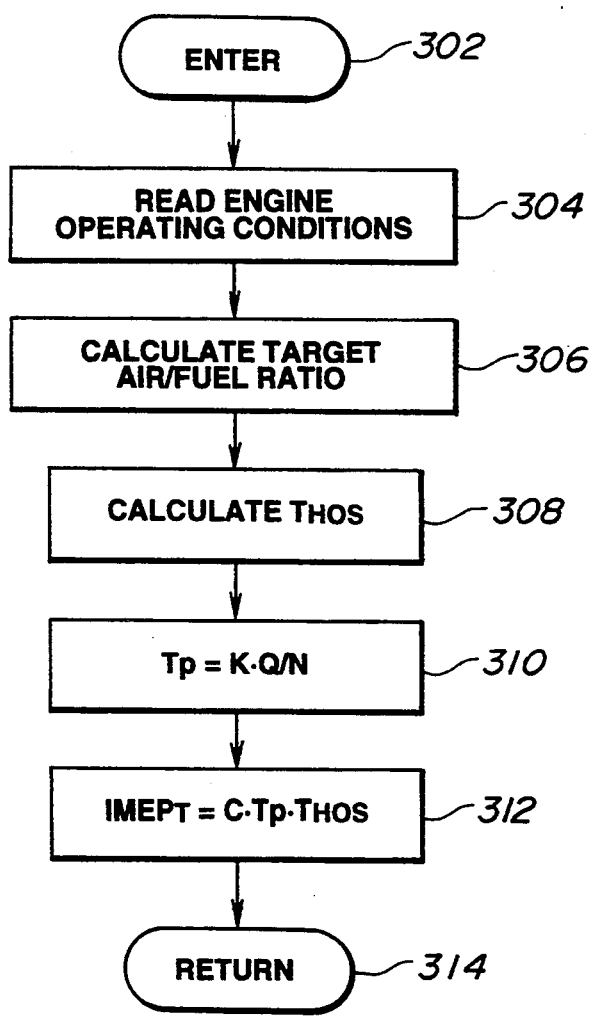
FIG. 3 is a flow diagram of the programming of the digital computer as it is used to calculate a target mean effective pressure.

FIG. 3 is a flow diagram of the programming of the digital computer as it is used to calculate the target mean effective pressure $IMEP_T$. The computer program is entered at the point 302. At the point 304 in the program, the engine operating conditions including the intake airflow Q, the engine speed N and the engine coolant temperature TW are read in to the computer memory. At the point 306 in the program, a target air/fuel ratio TA/F is calculated from a relationship programmed into the computer. This relationship defines the target air/fuel ratio TA/F as a function of engine coolant temperature TW. At the point 308 in the program, a torque correction factor $T_{HOS}$ is calculated from a relationship programmed into the computer. This relationship defines the torque correction factor $T_{HOS}$ as a function of target air/fuel ratio TA/F and engine speed N. At the point 310 in the program, a basic value for the fuel delivery requirement in the form of fuel-injection pulse-width Tp is calculated as $Tp = K \cdot Q/N$ where K is a constant, Q is the intake airflow and N is the engine speed. At the point 312 in the program, the target mean effective pressure $IMEP_T$ is calculated as $IMEP_T = C \cdot Tp \cdot T_{HOS}$ where C is a constant.

Figure 4:
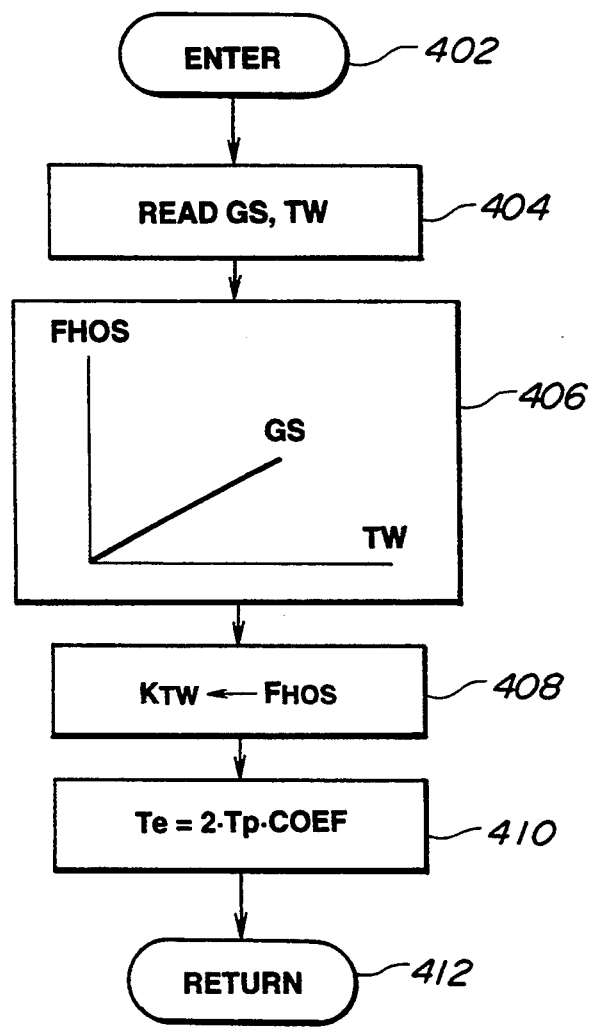
FIG. 4 is a flow diagram of the programming of the digital computer as it is used to calculate an effective fuel-injection pulse-width used during engine warming operation.

FIG. 4 is a flow diagram of the programming of the digital computer as it is used to calculate an effective fuel-injection pulse width Te used during engine worming operation. The computer program is entered at the point 402. At the point 404 in the program, the fuel volatility factor GS and the engine coolant temperature TW are read in to the computer memory. At the point 406 in the program, a fuel delivery requirement correction factor $F_{HOS}$ is calculated from a relationship programmed into the computer. This relationship defines the fuel delivery requirement correction factor $F_{HOS}$ as a function of fuel volatility factor GS and engine coolant temperature TW, as shown in the block 406 of FIG.

4. At the point 408 in the program, a coolant temperature related correction factor $K_{TW}$ is replaced with the calculated fuel delivery requirement correction factor $F_{HOS}$. At the point 410 in the program, the effective fuel-injection pulse-width Te is calculated as Te=2·Tp·COEF where COEF is a correction factor given as $$COEF=1+K_{TW}+K_{MR}+K_{AS}+K_{AI}+K_{ACC}$$

where $K_{TW}$ is a correction factor decreasing as the engine coolant temperature TW increases, this correction factor being replaced with the correction factor $F_{HOS}$ calculated at the point 406. The correction factor $K_{MR}$ is used for providing fuel enrichment control under high engine load conditions. The correction factor $K_{MR}$ is greater at a heavier engine load or at a higher engine speed. The correction factor $K_{AS}$ is used for providing fuel enrichment control when the engine is cranking. The correction factor $K_{AI}$ is used for providing fuel enrichment control when the engine is idling. The correction factor $K_{ACC}$ is used for providing fuel learning control during acceleration. Upon completion of this calculation, the program proceeds to the point 412 where the computer program is returned to the point 404.

Figure 5:
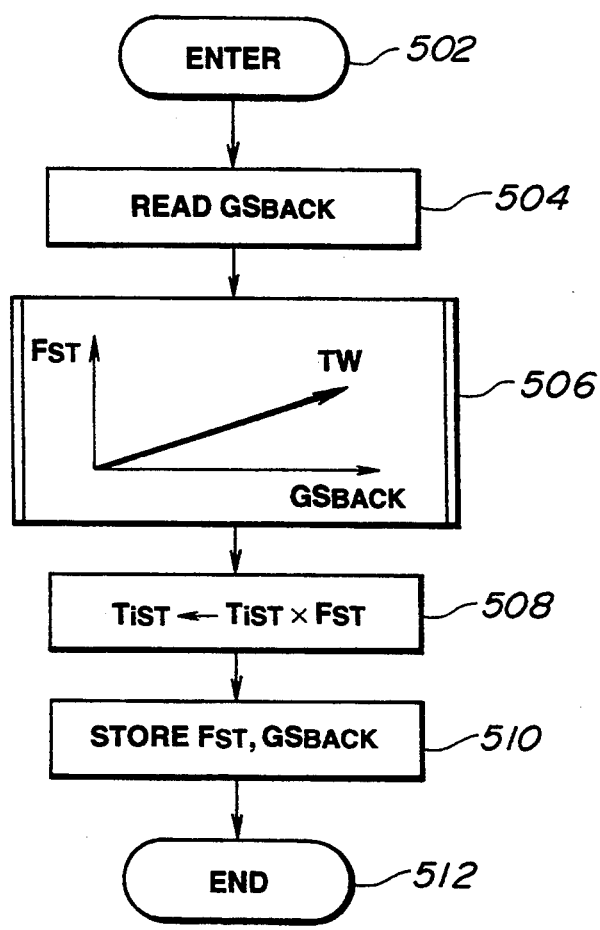
FIG. 5 is a flow diagram of the programming of the digital computer as it is used to correct the fuel-injection pulse-width for engine starting.

FIG. 5 is a flow diagram of the programming of the digital computer as it is used to correct the fuel-injection pulse-width for engine starting. The computer program is entered at the point 502. At the point 504 in the program, the backup value $GS_{BACK}$ of the fuel volatility factor GS is read from the random access memory of the control unit 60. At the point 506 in the program, a correction factor $F_{ST}$ for engine starting is calculated from a relationship programmed into the computer. This relationship defines the correction factor $F_{ST}$ as a function of backup value $GS_{BACK}$ and engine coolant temperature TW, as shown in the block 506 of FIG. 5. At the point 508 in the program, the fuel-injection pulse-width $Ti_{ST}$ for engine staring is corrected as $Ti_{ST}=Ti_{ST}\times F_{ST}$. At the point 510 in the program, the calculated correction factor $F_{ST}$ is stored, as the backup value $GS_{BACK}$ of the fuel volatility factor GS, in the random access memory of the control unit 60. Following this, the program proceeds to the end point 512.

Figure 6:
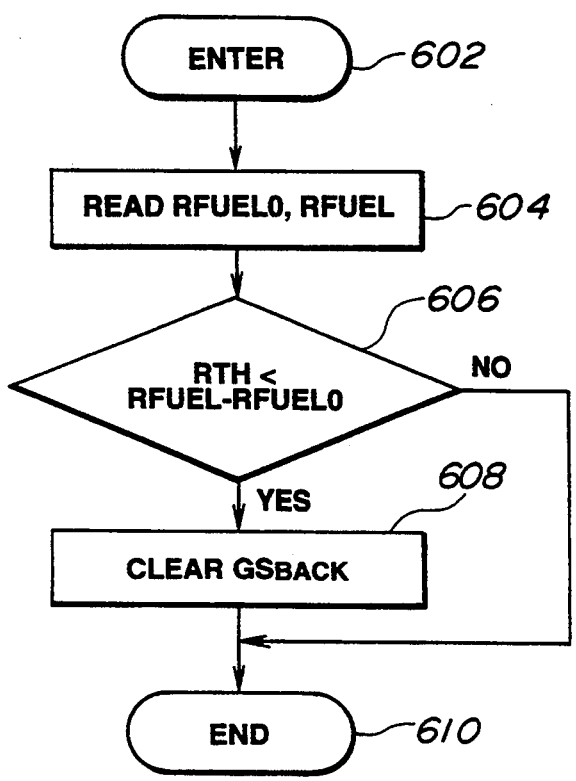
FIG. 6 is a flow diagram of the programming of the digital computer as it is used to clear the fuel volatility factor backup value.

In this embodiment, the amount of the residual fuel measured just before the engine stops is stored and compared with the amount of the residual fuel measured when the engine starts again. If the difference of the residual fuel amount measured when the engine starts again from the stored residual fuel amount value exceeds a predetermined value, it means that fuel has been charged and the backup value $GS_{BACK}$ of the fuel volatility factor GS is cleared. FIG. 6 is a flow diagram of the programming of the digital computer as it is used to clear the fuel volatility factor backup value $GS_{BACK}$. The computer program is entered at the point 602. At the point 604 in the program, the stored residual fuel amount value RFUEL0 and the existing residual fuel amount value RFUEL are read into the computer memory. At the point 604 in the program, a determination is made as to whether the difference of the stored residual fuel amount value RFUEL0 from the existing residual fuel amount value RFUEL is greater than a predetermined value RTH. If the answer to this question is "yes", then it means that fuel has been charged and the program proceeds to the point 608 where the backup value $GS_{BACK}$ is cleared and then to the end point 610. Otherwise, the program proceeds directly to the end point 610.

According to the invention, the amount of fuel supplied to the engine is corrected, according to the fuel volatility factor which indicates whether the fuel is heavy or light, to maintain a desired optimum air/fuel ratio. This is effective to ensure good driveability and minimized emission of pollutants even with fuel volatility variations. Furthermore, the invention eliminates the need for an expensive sensor used in detecting the fuel volatility.

What is claimed is:

1. An apparatus for detecting a volatility of fuel supplied to an internal combustion engine having at least one cylinder, comprising:

means sensitive to engine operating conditions for producing signals indicative of sensed engine operating conditions;

means sensitive to pressure in said cylinder for producing a signal indicative of a sensed cylinder pressure;

means for calculating a target mean effective pressure based on the sensed engine operating conditions;

means for calculating an actual mean effective pressure based on the sensed cylinder pressure; and means for calculating the fuel volatility as a function of the calculated target mean effective pressure and the calculated actual mean effective pressure.

2. The fuel volatility detecting apparatus as claimed in claim 1, wherein the engine opera ting conditions include an engine coolant temperature, and wherein the fuel volatility calculating means includes means for calculating a ratio of the actual mean effective pressure with respect to the target mean effective pressure, and means for calculating the fuel volatility as a function of the calculated ratio and the sensed engine coolant temperature.

3. The fuel volatility detecting apparatus as claimed in claim 2, wherein the actual mean effective pressure calculating means includes means for calculating the actual mean effective pressure $IMRP_R$ as $IMRP_R=(1/Vs)\cdot \int P\, dv$ where Vs is the stoke volume of the engine.

4. The fuel volatility detecting apparatus as claimed in claim 2, wherein the engine operating conditions further include an intake airflow and an engine speed, and wherein the target mean effective pressure calculating means includes means for calculating a target air/fuel ratio as a function of the sensed engine coolant temperature, means for calculating a torque correction factor as a function of the target air/fuel ratio and the sensed engine speed, means for calculating a basic value for the amount of fuel to be supplied to the engine as a function of the sensed intake airflow and the sensed engine speed, and means for calculating the target mean effective pressure as a function of the calculated basic value and the calculated torque correction factor.

5. The fuel volatility detecting apparatus as claimed in claim 1, wherein the engine operating conditions include an intake airflow, an engine coolant temperature and an engine speed, and wherein the target mean effective pressure calculating means includes means for calculating a target air/fuel ratio as a function of the sensed engine coolant temperature, means for calculating a torque correction factor as a function of the target air/fuel ratio and the sensed engine speed, means for calculating a basic value for the amount of fuel to be supplied to the engine as a function of the sensed intake airflow and the sensed engine speed, and means for calculating the target mean effective pressure as a function of the calculated basic value and the calculated torque correction factor.

6. The fuel volatility detecting apparatus as claimed in claim 1, further including means sensitive to engine coolant temperature for producing a signal indicative of sensed engine coolant temperature, means for calculating a correction factor as a function of the calculated fuel volatility and the sensed engine coolant temperature, and means for correcting a fuel delivery requirement as a function of the calculated correction factor during engine warming operation.

7. The fuel volatility detecting apparatus as claimed in claim 1, further including means sensitive to engine coolant temperature for producing a signal indicative of sensed engine coolant temperature, means for reading a backup value of fuel volatility factor from a memory, means for calculating a correction factor as a function of the read fuel volatility factor backup value and the sensed engine coolant temperature, means for correcting a fuel delivery requirement as a function of the calculated correction factor during engine starting operation, and means for storing the calculated correction factor to update the fuel volatility factor backup value in the memory.

8. The fuel volatility detecting apparatus as claimed in claim 7, further including means for storing a first amount of fuel residual in a fuel tank when the engine stops, means for measuring a second amount of fuel residual in the fuel tank when the engine starts, and means for clearing the fuel volatility factor backup value in the memory when a difference of the first residual fuel amount from the second residual fuel amount is greater than a predetermined value.

* * * * *